Dec. 6, 1932.  M. D. WILSON  1,890,352
CROSSING SIGNAL
Filed March 11, 1931  2 Sheets-Sheet 2

Inventor
Mercer D. Wilson.

Attorney.

Patented Dec. 6, 1932

1,890,352

UNITED STATES PATENT OFFICE

MERCER D. WILSON, OF PHOENIX, ARIZONA, ASSIGNOR TO STANDARD CROSSING GATE CORPORATION, OF PHOENIX, ARIZONA, A CORPORATION OF ARIZONA

CROSSING SIGNAL

Application filed March 11, 1931. Serial No. 521,685.

This invention relates to traffic control devices, particularly to automatic signal mechanisms that are responsive to a passing vehicle, such a train or electric car. My invention may be readily adapted to the solution of various problems in traffic control, but is particularly applicable to traffic control at an intersection where it is desired that one lane, for instance an automobile highway, be blocked off during the approach and passing of a vehicle in a second intersecting lane, such as a train moving along a railroad track.

Hereinafter the lane controlled by the signal member will be referred to as the traffic lane, and the vehicle in the intersecting lane to which the signal mechanism is responsive will be termed the control vehicle.

My invention includes pivoted signal means which may be adapted to swing either vertically or horizontally as a purely visual signal, but which preferably swings in a horizontal plane to serve as a traffic gate. This signal means reciprocates between a "stop" position and a "go" position, one movement of the reciprocation being effected by a power-driven mechanism, and the opposite movement of the reciprocation being accomplished by the force of gravity. By this arrangement, the power-driven movement not only moves the signal member from one position to another, but also by displacing a suitable weight against the force of gravity stores energy in the form of energy of position to be used in accomplishing the second and opposite movement of the signal member. Preferably, the signal member indicates "go" when it is at the end of the power-driven movement, energy being then stored for the opposite movement of the signal member to the "stop" position. In other words, when the signal is in its position indicating "go" potential energy is available for the second movement, and an approaching vehicle controlling the signal mechanism merely serves to release the stored energy. After the departure of the vehicle the power-driven movement is automatically initiated and completed to place the parts in their "go" positions.

An important advantage of this arrangement is that in case the power-driven mechanism fails to function, the signal member will move to the "stop" position at the approach of the first control vehicle, and then will fail to move from the "stop" position, thereby calling attention to the condition of the mechanism before any serious accidents can be caused by the break-down.

An additional safety feature is that the signal is maintained in the "go" position only so long as an electric control circuit is energized. A control vehicle, by de-energizing this circuit, initiates the gravity movement of the mechanism. Consequently, when the control circuit is opened or otherwise de-energized for any reason, such as by accident or because of a defect, the signal member immediately moves to the "stop" position.

In order to avoid damage in case a vehicle in the traffic lane should collide with the pivoted signal member, my invention provides for yieldingly mounting this member. Preferably this is accomplished by incorporating a floating sleeve embracing a vertical shaft and supported thereon by a follower on the shaft engaging a V-shaped cam surface on the sleeve. In my preferred form of this flexible connection, the signal member will return to its proper position automatically from any degree of rotary displacement up to 180°.

The power-driven mechanism in the preferred form of my invention incorporates a fluid-pressure-actuated mechanism, preferably in the form of a hydraulic lift actuated by an electrically driven liquid pump. The use of a hydraulic lift results in an even movement of the signal member, thereby minimizing shock on the moving parts of the mechanism. A feature of my preferred modification is that on the gravity movement of the device the lift serves as a hydraulic cushion.

I provide for controlling the hydraulic lift by a combination of two switches in the motor circuit, one a mechanically actuated switch normally held open against the action of a yielding means, the second a relay switch normally energized by the control circuit to be held closed in opposition to its inherent tendency to open. When the control circuit is de-energized by the approach of a control vehicle, the relay switch opens and the mechanical switch released by the gravity movement of the mechanism thereupon closes. The motor is idle until the control circuit becomes energized upon the departure of the control vehicle, thereby closing the relay switch. As the moving parts reach their set positions, the mechanical switch is forced open to de-energize the motor circuit. This inter-relation of the two switches provides for automatic control of the motor.

The mechanism is sustained in its set position against the force of gravity by fluid pressure within the hydraulic lift and the gravity movement from the set position is provided by releasing said fluid pressure. For this purpose a valve in a relief pipe communicating with the pressure cylinder of the ram is weighted to gravitate to an open position and is normally held closed against such gravitation by virtue of a solenoid energized by the control circuit. The solenoid has sufficient power not only to hold the valve closed but also to move it from the open position in opposition to its weight.

It is apparent that the combination of the two switches in the motor circuit with the electrically actuated valve provides for complete automatic control of the signal member.

The above and other objects and advantages of my improvement will be apparent in the detailed description to follow, considered with the accompanying drawings, in which—

Fig. 3 is a similar view showing the parts at the end of the power-driven movement in their normal positions;

Fig. 5 is a lateral vertical cross-section of the signal member taken as indicated by the line 5—5 of Fig. 2; and Fig. 6 is a wiring diagram suitable for the preferred form of my invention.

Figure 1:
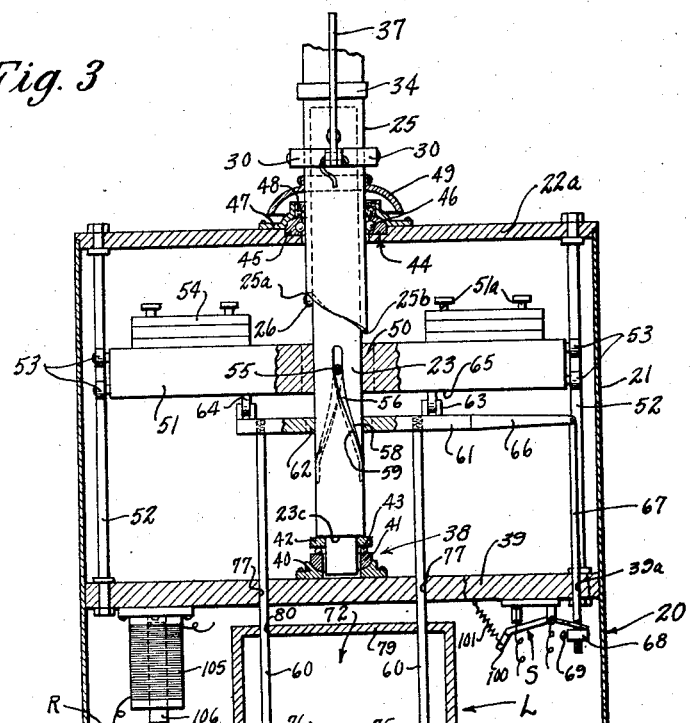
Fig. 1 is a side elevation of my invention.

The working parts of the signal mechanism are enclosed by a housing generally designated 20, which comprises a cylindrical wall 21, a top plate 22a, and a bottom plate 22b. Through top plate 22 a vertical shaft 23 extends to serve as a pivotal mounting for the signal member, which is generally designated by the numeral 24. The signal member is flexibly connected to shaft 23 by virtue of a floating sleeve 25, which carries the signal member, and which rests upon a nonfriction roller 26 radially mounted on the periphery of shaft 23.

The lower edge of sleeve 25 is cut away to a V-shaped recess or cam surface forming a vertex at 25a and a point at 25b. The roller 26, mounted radially on shaft 23, supports the sleeve by normally engaging vertex 25a. The angularity of the cam surfaces and the magnitude of the superimposed weight is such that the normal relation of the sleeve and roller is maintained during ordinary movements of the mechanism and tends to be restored whenever an external force or obstacle causes the sleeve to rotate relative to the shaft.

Figure 2:
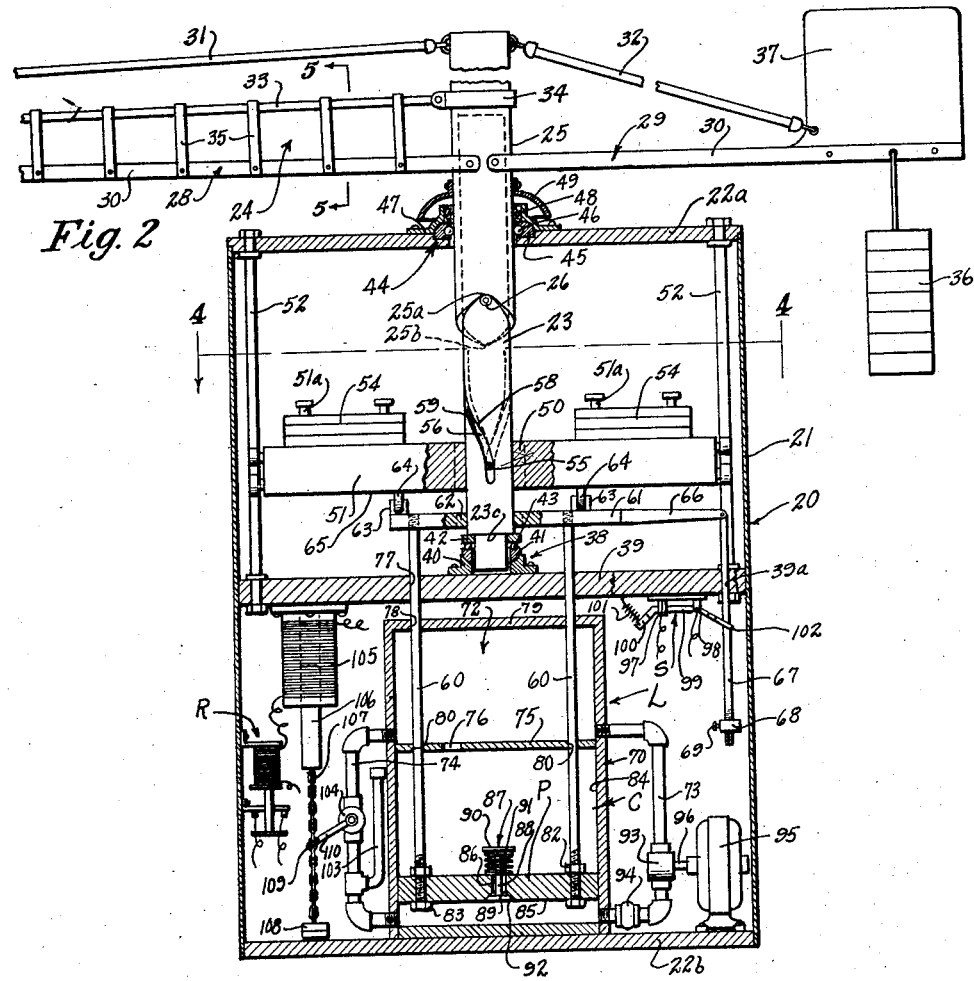
Fig. 2 is an enlarged side elevation partly in section showing the parts at the beginning of the power-driven movement.
Figure 4:
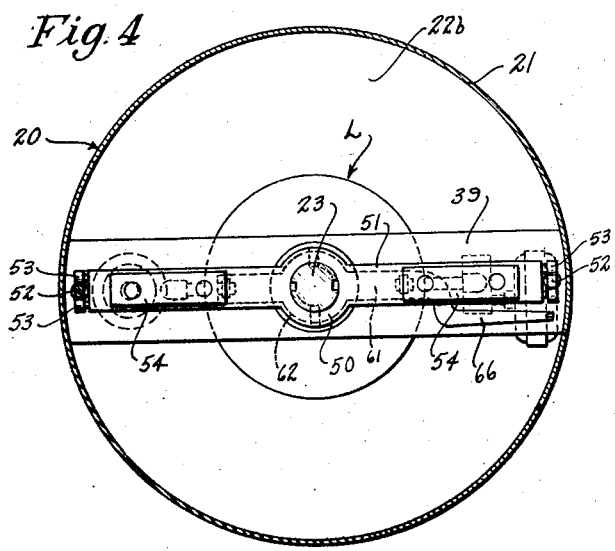
Fig. 4 is a horizontal section taken as indicated by the lines 4—4 of Fig. 2.

Signal member 24 preferably comprises a relatively long arm 28 serving as a crossing gate and a relatively short arm 29 serving to counter-balance the long arm. Each arm comprises a pair of horizontally disposed light frame members or bars 30 which are attached to the sleeve 25 at their inner ends and converge together at their outer ends. The outer ends of the long arm and the short arm are supported respectively by cables 31 and 32 which are connected to the top of sleeve 25. As additional support for longer arm 28, an additional cable 33 extends from the outer end of the arm to a collar 34 attached to sleeve 25, and at spaced intermediate points along this cable saddles 35 are hung and terminally connected to bars 30, as shown in Fig. 2. At the outer end of the shorter arm 29, a weight 36 serves to counter-balance the heavier arm 28 and a suitably dimensioned vane 37 serves to equalize surfaces presented to the wind by the two arms.

Shaft 23 is vertically aligned to float on a thrust bearing, generally designated 38, and which is supported by a horizontal plate 39. Plate 39 is attached at each end to cylindrical wall 21 of the housing. This thrust bearing may be of a well-known type comprising a cup member 40 presenting a spherical surface, and two rings 41 and 42 forming a race for steel balls 43, the lower ring 41 seating in cup member 40 and the upper ring 42 abutting a shoulder 23c on the shaft.

Vertical alignment of shaft 23 may be maintained by a radial bearing generally designated 44 mounted on upper plate 22a. This bearing may be designed as indicated in the drawings, where 45 is a ring forming a race retaining steel balls 46 in contact with the peripheral surface of sleeve 25 and 47 designates a collar for securing ring 45. Preferably a felt collar 48, retained by collar 47, serves as a dust ring. For protection from the weather, a skirt 49 carried by sleeve 25 may extend over the bearing.

It is essential that bearings 44 not only provide for the vertical alignment of shaft 23, but also freely permit vertical movement of sleeve 25 when the sleeve is rotated relatively to the shaft 23.

Spaced below floating sleeve 25, is a second sleeve 50 also slidingly embracing shaft 23. Preferably sleeve 50 forms an integral part of a laterally extending weight 51. The vertically movable weight 51 is secured at each end against rotation around shaft 23 by means of vertical guide rods 52 which are terminally connected to top plate 22a and to plate 39, thus also serving as a brace between the two plates. One or more pairs of non-friction rollers 53 are mounted on each end of weight 51 to engage opposite sides of guide rods 52. Preferably on each side of shaft 23 means are provided for adding or removing increments to weight 51. These may be in the form of bars 54 apertured to receive vertical bolts 51a carried by weight 51.

Weight 51 is operatively connected to shaft 23 in such a manner that vertical movement of weight 51 from the position shown in Fig. 2 to that shown in Fig. 3 causes shaft 23 to rotate approximately ninety degrees in one direction, and the reverse movement of weight 51 causes the reverse rotation of shaft 23. Preferably this operative connection is provided by means of a radially inwardly extending non-friction roller 55 carried by the inner peripheral wall of sleeve 50 engaging a spiral-shaped groove 56 cut in the periphery of shaft 23. In the preferred form of my invention shown in the drawings there are two of the inwardly extending members 55 diametrically opposed and two corresponding grooves 56. Rollers 55 serve as followers engaging cam surfaces presented by grooves 56, the cam surfaces 58 being engaged on the upward movement of the weight to revolve shaft 23 counter-clockwise, ninety degrees, and cam surfaces 59 being engaged on the downward movement to reverse the rotation of shaft 23 by ninety degrees. Preferably the upper and lower ends of grooves 56 are extended vertically so that minor movements of weight 51 at the upper and lower limits of its range of movement will not revolve the shaft beyond the desired ninety degrees. The mass of weight 51 is such that by the force of gravity alone it will move freely, if unsupported, from the set position at the upper end of slot 56, shown in Fig. 3, to the normal position shown in Fig. 2, revolving shaft 23 during such movement.

The power means for moving weight 51 upward preferably includes a hydraulic lift, generally designated L in the drawings, comprising a cylinder C having a piston P, from which two spaced piston rods 60 extend upward and terminally connect with a yoke 61. Yoke 61 has an integral collar 62 slidingly embracing shaft 23 and carries in brackets 63 on its upper surface non-friction rollers 64 positioned to abut the lower face 65 of weight 51. By means of these rollers vertical force is transmitted from the lift L to weight 51 with a minimum tendency that lateral vibrations of the weight may be in turn transmitted to piston rods 60. Yoke 61 has an offset extension 66 from the end of which depends a vertical rod 67 slidingly journaled in aperture 39a of plate 39. The lower end of rod 67 is screw-threaded to receive an adjustable nut 68 having a radial set-screw 69. Nut 68 cooperates with an automatic switch S in a manner to be later described.

Hydraulic lift L may be constructed to include a closed tank, generally designated 70, the lower portion of which is the working cylinder C, an upper portion 72 serving as a liquid reservoir. Reservoir 72 and working cylinder C are connected by a pipe 73 to feed the working cylinder and a return pipe 74, thus constituting a self-contained hydraulic system.

Tank 70 is internally spanned at an intermediate horizontal plane by a plate 75 suitably apertured at 76 to permit the free flow of liquid therethrough. The spaced piston rods 60 are preferably guided in their longitudinal movements by suitable apertures 77 in plate 39, apertures 78 in the upper head 79 of tank 70, and apertures 80 in plate 75.

The lower ends of piston rods 60 are received by the piston P and suitably secured thereto as by means of opposed nuts 82 and 83 screw-threadedly engaging the piston rods. Piston P, having fluid-tight fit with the inner peripheral surface 84 of working cylinder 71 and being adapted to reciprocate vertically in the cylinder, is of a type well-known to the art. It has a lower working face 85 and is bored to form a relief passage 86 controlled by an automatic relief valve 87.

This valve includes a valve stem 88 projecting upward through the passage. The stem carries on its lower end a bevelled closure plate 89 and on its upper end a head or flange 90. A helical expansible spring 91 surrounding the upper portion of the stem is confined between the upper face of the piston and flange 90, thereby continuously exerting a force tending to seat closure plate 89 in a complementary bevelled valve seat 92 formed at the lower end of the relief passage. Valve 87 is so positioned that it may be opened at the upper end of the piston stroke by the impingement of valve head 90 against plate 75, thereby reducing the liquid pressure on the working face 85 of the piston. The relief valve serves as one means to limit the upward movement of the piston.

Incorporated in feed pipe 73 is a fluid pumping means, preferably a gear pump 93, arranged to propel fluid under pressure into cylinder C. A check valve 94 in feed pipe 73 below pump 93 prevents flow in the opposite direction from the cylinder towards the pump. Pump 93 is actuated by a prime mover preferably in the form of an electric motor 95 operatively connected to the pump by a shaft 96.

The circuit energizing this motor may be automatically controlled by a mechanical switch S and a relay R. Switch S includes two contacts 97 and 98 mounted on the bottom of and suitably insulated from plate 39. To contact 97 a switch-blade 99 is pivotally mounted; the end of the blade disposed towards contact 97 has an angular extension 100 of non-conducting material which is connected to plate 39 by a suitable contractile spring 101. Spring 101 tends continuously to close the switch. Switch-blade 100 is extended to the other side of its pivot point as an angular bifurcated arm 102 also of non-conducting material. The forked ends of arm 102 extend on each side of rod 67 and are positioned to be engaged by nut 68 thereon. Nut 68 may be adjusted to coact with arm 102 at a suitable point to terminate the power stroke of piston 81 by opening switch S to de-energize motor 95.

In the set position of the parts, as shown in Fig. 3, switch S is held open by nut 68. Whenever the moving parts retract from their set positions, spring 101 closes the switch, as shown in Fig. 2. Preferably automatic switch S, rather than relief valve 87, is adjusted to stop the upward movement of the ram, the relief valve serving as an emergency device becoming effective to limit the upward movement of the piston only when inertia causes excessive movement of the pump after the motor is de-energized or in case switch S fails to open.

Relay R in the motor circuit is actuated by a normally energized control circuit which is adapted to be de-energized by the approach of a control vehicle. The relay is designed to have an inherent tendency to open and is closed only when energized by the control circuit.

At the lower end of return pipe 74 a riser or stand-pipe 103 may branch off vertically to serve as an air cushion, the upper end being sealed. Above the opening of this pipe, means may be provided in the form of a valve 104 to control flow through return pipe 74. By arranging an automatic control to manipulate valve 104, I provide means auxiliary to pump 93 for controlling pressure against the working face 85 of piston P.

Automatic control of valve 104 may be attained by mounting a suitable solenoid 105 on the lower face of plate 39 and electrically connecting it with the aforementioned control circuit. From a core 106 depending vertically from solenoid 105, a chain 107 is suspended to carry a weight 108, and at an intermediate point on the chain a ring 109 slidingly engages handle 110 of valve 104. In the set position of the mechanism shown in Fig. 3 the solenoid being energized by the control circuit, holds valve 110 closed against the opposite tendency of weight 108 and upon de-energization of the solenoid, weight 108 is permitted to open the valve as shown in Fig. 2. It is necessary that solenoid 105 have approximately twice the effect of weight 108 since in addition to operating the valve, energization of the solenoid must lift the weight.

The wiring of my invention may be understood from Fig. 6, indicating my preferred arrangement. From a suitable source of current, such as a battery 111, leads 112 and 113 extend to the terminals of motor 95. Lead 113 includes the mechanically actuated switch S and lead 112 is broken by the de-energization of the normally energized relay R. Connected to lead 112 intermediate the battery and the relay, wire 114 extends to the coil of relay R and is connected by a branch wire 115 to an isolated and insulated section of rail 116. Wire 117 interconnects terminals of the coils of relay R and solenoid 105, and wire 118 interconnecting the second terminal of the solenoid coil and an intermediate cell in battery 111 completes the control circuit. Wire 118 has a branch 119 connected to the second rail 120.

The automatic operation of my invention may now be reviewed, starting with the mechanism in the set position shown in Fig. 3. Valve 104 is held closed by solenoid 105, relay R is closing a gap in wire 112, switch S is open and the motor is idle with piston P at the top of its stroke. If fluid leakage should develop, switch S will be released to energize motor 95 before follower 55 drops from the upper straight portion of slot 56.

When a control vehicle enters a control zone defined by the length of insulated rail section 116, the control vehicle short circuits the control circuit as indicated by dotted line 121 in Fig. 6, thereby de-energizing relay R and solenoid 105. Weight 108 immediately opens valve 104 to permit the escape of fluid from cylinder C and piston P yielding to weight 51 drops smoothly to the position shown in Fig. 2. A short interval after relay R opens a gap in wire 112, switch S is released by the downward movement of the piston and closes wire 113, but because of relay R being open the motor is not energized. Signal arm 28 is swung across to block the traffic lane as long as the control vehicle remains in the control zone.

The same sequence of movements would result from failure of the control circuit for any reason, and obviously failure in the motor circuit would prevent the return of the signal arm to its normal position.

When the control vehicle leaves the control zone, the control circuit returns to its normal state, energizing relay R and solenoid 105, with the result that solenoid 105 closes valve 104 and relay R closes to complete the motor circuit. The motor driving pump 93 immediately builds up pressure in cylinder C, forcing piston P upward. As follower 55 acts against cam surface 58, signal arm 28 is returned to its normal position. When the follower enters the upward straight portion of slot 56, nut 68 opens switch S, de-energizing motor 95. If switch S fails to close or for any other reason fluid pressure continues to be built up in cylinder C, relief valve 87 impinges upon plate 75 to prevent damage. The piston, in such a case, will be held at the top of its stroke with the flow from the pump being carried through relief passage 86 and an aperture 76 into reservoir 72.

For the purpose of disclosing and illustrating the principles incorporated in my device I have described a preferred form in specific detail, but it is to be recognized that my invention may be widely modified without changing its essential character and I reserve the right to all such modifications that are properly within the range of my appended claims.

Having described my invention, I claim:

1. A signal system having, in combination: a signal member; a revolvable shaft operatively connected with the signal member; a member mounted axially slidable relative to the shaft; cam means interconnecting said shaft and slidable member whereby movement of said member will cause rotation of the shaft; power means to raise the slidable member against gravity and cause rotation of the shaft in one direction, said slidable member being sufficiently weighted to cause rotation of the shaft in the opposite direction by its gravitational fall; and remote control means controlling the power means.

2. A signal system having, in combination: a signal member; a revolvable shaft operatively connected with the signal member; a member mounted axially slidable relative to the shaft; cam means interconnecting said shaft and slidable member whereby movement of said member will cause rotation of the shaft; power means to raise the slidable member against gravity and cause rotation of the shaft in one direction, said slidable member being sufficiently weighted to cause rotation of the shaft in the opposite direction by its gravitational fall; and means responsive to a passing vehicle to control the power means.

3. A signal system having, in combination: a signal member; a revolvable shaft operatively connected to the signal member; a weight adapted for non-rotative movement relative to the shaft and having operative connections with the shaft whereby the shaft is revolved by such movement of the weight; power-actuated means adapted to move the weight against gravity, thereby revolving the shaft in one direction, the weight being adapted to make the reverse movement by gravity, thereby revolving the shaft in the opposite direction; and means responsive to a passing vehicle to control the power actuated means.

4. A signal system having, in combination: a signal member; a revolvable shaft operatively connected to the signal member; a weight adapted for non-rotative movement relative to the shaft and having operative connections with the shaft whereby the shaft is revolved by such movement of the weight; a fluid-pressure-actuated lift adapted to move the weight against gravity, thereby revolving the shaft in one direction, the weight being adapted to make the reverse movement by gravity, thereby revolving the shaft in the opposite direction; power means to deliver fluid under pressure to the fluid-pressure lift, thereby moving the lift in one direction; and means responsive to a passing vehicle to release the fluid in the lift.

5. A signal system having, in combination: a signal member; a revolvable shaft operatively connected to the signal member; a weight adapted for non-rotative movement relative to the shaft and having operative connections with the shaft whereby the shaft is revolved by such movement of the weight; a fluid pressure actuated lift adapted to move the weight against gravity, thereby revolving the shaft in one direction, the weight being adapted to make the reverse movement by gravity, thereby revolving the shaft in the opposite direction; automatically controlled power means to deliver fluid under pressure to the lift, thereby moving the lift in one direction; and means responsive to a passing vehicle to release the fluid pressure in the lift.

6. A signal system having, in combination: a signal member; a revolvable shaft operatively connected to the signal member, said shaft having cam surfaces on its periphery inclined relative to the axis of the shaft; a movable weight confined to non-rotative movement relative to the shaft; a follower associated with the weight and engaging said cam surfaces to rotate the shaft; power actuated means adapted to move the weight against gravity, thereby revolving the shaft in one direction, the weight being adapted to make the reverse movement by gravity, thereby revolving the shaft in the opposite direction; and means responsive to a passing vehicle to control the power actuated means.

7. A signal system having, in combination: a signal member; a revolvable shaft operatively connected to the signal member, said shaft having cam surfaces on its periphery inclined relative to the axis of the shaft; a weight confined to non-rotative movement relative to the shaft; a follower associated with the weight and engaging said cam surfaces to rotate the shaft; a fluid-pressure-actuated lift adapted to move the weight against gravity, thereby revolving the shaft in one direction, the weight being adapted to make the reverse movement by gravity, thereby revolving the shaft in the opposite direction; means to deliver fluid under pressure to the lift, thereby moving the lift in one direction against the weight; and means responsive to a passing vehicle to release the fluid pressure in the lift.

8. A signal system having, in combination: a signal member; a revolvable shaft operatively connected to the signal member; a weight adapted for non-rotative movement relative to the shaft and having operative connections with the shaft whereby the shaft is revolved by such movement of the weight; a fluid-pressure-actuated lift adapted to move the weight against gravity, thereby revolving the shaft in one direction, the weight being adapted to make the reverse movement by gravity, thereby revolving the shaft in the opposite direction; a pump operatively connected with said lift and adapted to deliver fluid to the lift under pressure; a motor operatively connected with said pump; an automatic switch in the motor circuit associated with the lift and adapted to de-energize the motor at the end of the lift movement against the weight; a second automatic switch responsive to a control vehicle to energize the motor upon the departure of the control vehicle; and means responsive to the control vehicle to release the fluid pressure in the lift upon the approach of the control vehicle.

9. A signal system having, in combination: a signal member; a revolvable shaft operatively connected to the signal member, said shaft having cam surfaces on its periphery inclined relative to the axis of the shaft; a weight confined to non-rotative movement relative to the shaft; a follower associated with the weight and engaging said cam surfaces to rotate the shaft; a fluid-pressure-actuated lift adapted to move the weight against gravity, thereby revolving the shaft in one direction, the weight being adapted to make the reverse movement by gravity, thereby revolving the shaft in the opposite direction; a pump operatively connected with said lift and adapted to deliver fluid under pressure thereto; a motor operatively connected with said pump; an automatic switch in the motor circuit associated with the lift and adapted to open at the end of the lift movement against the weight; a second automatic switch responsive to a control vehicle to energize the motor upon the departure of the control vehicle; and means responsive to the control vehicle to release the fluid pressure in the lift upon the approach of the control vehicle.

10. A signal system having, in combination: a signal member; a revolvable shaft operatively connected to the signal member; a weight adapted for non-rotative movement relative to the shaft and having operative connections with the shaft to revolve the shaft by such movement; a pressure cylinder; a piston operatively associated with the weight and adapted to reciprocate axially within the cylinder, moving in one direction by fluid pressure against the weight and in the opposite direction by gravitation of the weight; a pump; a pipe connecting the pump and cylinder, said pump being adapted to propel fluid to the cylinder against the piston under pressure; a check valve in said pipe; a power means to actuate the pump; automatic means associated with said piston and adapted to de-energize the power means to terminate the fluid-pressure-actuated movement of the piston; a second automatic means responsive to a control vehicle to energize the power means upon the departure of the control vehicle; and means responsive to the control vehicle to reduce the fluid pressure against said piston upon the approach of the control vehicle, thereby causing the gravitational movement of the piston.

11. A signal system having, in combination: a signal member; a substantially vertical, revolvable shaft operatively connected to the signal member; a weighted sleeve slidingly embracing the shaft and adapted to reciprocate thereon; a guide engaging the sleeve and adapted to confine the sleeve to linear movement parallel with the shaft; a cam-and-follower connection between the weighted sleeve and shaft whereby linear movement of the weight in one direction is translated into rotative movement of the shaft in one direction and linear movement of the weight in the opposite direction produces the opposite rotative effect; power actuated means adapted to move the weight against gravity, the weight being adapted to make the reverse movement by gravity, and automatic means responsive to a control vehicle to control the power means.

12. A signal system having, in combination: a signal member; a substantially vertical, revolvable shaft operatively connected to the signal member; a weighted sleeve slidingly embracing the shaft and adapted to reciprocate thereon; a guide engaging the sleeve and adapted to confine the sleeve to linear movement parallel with the shaft; a cam-and-follower connection between the weighted sleeve and shaft whereby linear movement of the weight in one direction is translated into rotative movement of the shaft in one direction and linear movement of the weight in the opposite direction produces the opposite rotative effect; a fluid-pressure-actuated lift adapted to move the weight against gravity, the weight being adapted to make the reverse movement by gravity; power means to deliver fluid under pressure to the lift, thereby moving the lift in one direction; automatic means responsive to a control vehicle to control the power means; and a second automatic means responsive to the control vehicle to release the fluid pressure in the lift, thereby permitting the weight to retract the lift.

13. A signal system having, in combination: a signal member; a substantially vertical, revolvable shaft operatively connected to the signal member; a weighted sleeve slidingly embracing the shaft and adapted to reciprocate thereon; a guide engaging the sleeve and adapted to confine the sleeve to linear movement parallel with the shaft; a cam-and-follower connection between the weighted sleeve and shaft whereby linear movement of the weight in one direction is translated into rotative movement of the shaft in one direction and linear movement of the weight in the opposite direction produces the opposite rotative effect; a fluid-pressure-actuated lift adapted to move the weight against gravity, the weight being adapted to make the reverse movement by gravity; a pump operatively connected with said lift and adapted to deliver fluid under pressure to said lift; a motor operatively connected with said pump; an automatic switch associated with the lift and adapted to de-energize the motor to terminate movement of the lift against the weight; a second automatic switch responsive to a control vehicle to energize the motor upon the departure of the control vehicle; and means responsive to a passing vehicle to release the fluid pressure within the lift, thereby causing the lift to retract under the weight of said sleeve.

14. A signal system having, in combination: a signal member; a substantially vertical, revolvable shaft operatively connected to the signal member; a weighted sleeve slidingly embracing the shaft and adapted to reciprocate thereon; a guide engaging the sleeve and adapted to confine the sleeve to linear movement parallel with the shaft; a cam-and-follower connection between the weighted sleeve and shaft whereby linear movement of the weight in one direction is translated into rotative movement of the shaft in one direction and linear movement of the weight in the opposite direction produces the opposite rotative effect; a pressure cylinder; a piston operatively associated with the weight and adapted to reciprocate axially of the cylinder, moving in one direction by fluid pressure against the weight and in the opposite direction by gravitation of the weight; a pump; a pipe connecting the pump and cylinder, said pump being adapted to propel fluid to the cylinder against the piston under pressure; a check valve in the said pipe; a power means to actuate the pump; automatic means associated with said piston and adapted to de-energize the power means to terminate the fluid-pressure-actuated movement of the piston; a second automatic means responsive to a control vehicle to energize the power means upon the departure of the control vehicle; and means responsive to the control vehicle to reduce the fluid pressure against said piston upon the approach of the control vehicle, thereby causing the gravitational movement of the piston.

15. A signal system having, in combination: a pivotally mounted signal member; a substantially vertical revolvable shaft operatively connected to the signal member; a weighted sleeve slidingly embracing the shaft and adapted to reciprocate thereon; a guide engaging the sleeve and adapted to confine the sleeve to linear movement parallel with the shaft; a cam-and-follower connection between the weighted sleeve and shaft whereby linear movement of the weight in one direction is translated into rotative movement of the shaft in one direction and linear movement of the weight in the opposite direction produces the opposite rotative effect; a pressure cylinder; a piston operatively associated with the weight and adapted to reciprocate axially of the cylinder, moving in one direction by fluid pressure against the weight and in the opposite direction by gravitation of the weight; a fluid reservoir; a pump; a pipe connecting the reservoir and pump; a pipe connecting the pump and working cylinder, said pump being adapted to propel fluid from the reservoir to the cylinder under pressure; a check valve in the second pipe; an electric motor operatively connected with the pump; an automatic switch associated with the piston, said switch being adapted to de-energize the motor to terminate the fluid-pressure-actuated movement of the piston; a return pipe connecting the cylinder and reservoir; a valve in the return pipe; a yielding means normally maintaining said valve in a closed position; and electro-magnetic means responsive to a passing vehicle to open said valve in opposition to the yielding means, thereby reducing the fluid-pressure in the cylinder and causing the piston to move downward under pressure from the weighted sleeve.

16. A signal system having, in combination: a signal member; a vertical revolvable shaft; a floating sleeve embracing the shaft and operatively connected to the signal member, said sleeve having a V-shaped cam surface on its lower edge; a follower carried by the shaft, said follower supporting the floating sleeve and normally engaging the sleeve at the vertex of the cam surface; a member mounted axially slidable relative to the shaft; cam means interconnecting said shaft and slidable member whereby vertical movement of said member will cause rotation of the shaft; power means to raise the slidable member against gravity and thereby to cause rotation of the shaft in one direction, said slidable member being sufficiently weighted to cause rotation of the shaft in the opposite direction by its gravitational fall; and means responsive to a passing vehicle to control the power means.

In witness that I claim the foregoing I have hereunto subscribed my name this 4th day of February, 1931.

MERCER D. WILSON.